US009132551B2

(12) United States Patent
Zhang et al.

(10) Patent No.: US 9,132,551 B2
(45) Date of Patent: Sep. 15, 2015

(54) TELEOPERATED INDUSTRIAL ROBOTS

(71) Applicant: ABB Technology AG, Zurich (CH)

(72) Inventors: Biao Zhang, West Hartford, CT (US);
Harald Staab, Windsor, CT (US);
Jianjun Wang, West Hartford, CT (US);
George Q. Zhang, Windsor, CT (US);
Remus Boca, Simsbury, CT (US);
Sangeun Choi, Simsbury, CT (US);
Thomas A. Fuhlbrigge, Ellington, CT (US); Soenke Kock, Schriesheim (DE);
Heping Chen, Austin, TX (US)

(73) Assignee: ABB Technology AG, Zurich (CH)

( * ) Notice: Subject to any disclaimer, the term of this patent is extended or adjusted under 35 U.S.C. 154(b) by 64 days.

(21) Appl. No.: 14/075,136

(22) Filed: Nov. 8, 2013

(65) Prior Publication Data

US 2014/0156073 A1 Jun. 5, 2014

Related U.S. Application Data

(60) Provisional application No. 61/731,792, filed on Nov. 30, 2012.

(51) Int. Cl.
*B25J 9/16* (2006.01)
*B25J 13/00* (2006.01)
*G05D 1/00* (2006.01)
*H04L 29/08* (2006.01)
*G05D 1/02* (2006.01)

(52) U.S. Cl.
CPC .............. *B25J 9/1689* (2013.01); *B25J 13/006* (2013.01); *G05D 1/0022* (2013.01); *G05B 2219/33192* (2013.01); *G05B 2219/33242* (2013.01); *G05B 2219/34466* (2013.01); *G05D 1/0282* (2013.01); *H04L 67/125* (2013.01)

(58) Field of Classification Search
None
See application file for complete search history.

(56) References Cited

U.S. PATENT DOCUMENTS

| 5,038,089 | A  | * | 8/1991  | Szakaly         | 701/23  |
| 6,523,629 | B1 | * | 2/2003  | Buttz et al.    | 180/167 |
| 6,791,472 | B1 | * | 9/2004  | Hoffberg        | 340/905 |
| 7,069,111 | B2 | * | 6/2006  | Glenn et al.    | 700/245 |
| 7,633,852 | B2 | * | 12/2009 | Brummette et al.| 370/208 |
| 8,797,976 | B2 | * | 8/2014  | Hyoudou         | 370/329 |
| 2003/0028286 | A1 | * | 2/2003 | Glenn et al.    | 700/245 |
| 2010/0278086 | A1 | * | 11/2010 | Pochiraju et al.| 370/310 |

* cited by examiner

*Primary Examiner* — Jason Holloway

(74) *Attorney, Agent, or Firm* — Michael M. Rickin

(57) ABSTRACT

A teleoperated robot system has a watchdog to determine if the rate of data transmission from a computing device such as a robot controller located in the station used by the operator of the teleoperated robot to the remotely located industrial robot has fallen below a minimum data rate or the time for transmission of data has exceeded a maximum time. Upon the occurrence of either or both of the foregoing, one or more types of corrective action are undertaken to bring the teleoperated robot and the processes performed by the robot.

2 Claims, 11 Drawing Sheets

TELEOPERATED INDUSTRIAL ROBOTS

FIELD OF THE INVENTION

This invention relates to the teleoperation of one or more robots or other machines with at least one actuated mechanism.

DESCRIPTION OF THE PRIOR ART

An industrial robot is an automatically controlled, reprogrammable, multipurpose manipulator programmable in three or more axes. Examples of industrial robots are robots located at a fixed position that are mobile by themselves or mobile because the robot is mounted on a device that it is itself mobile such as a motorized vehicle or mounted on a track or gantry etc.

Teleoperation of an industrial robot occurs when the operator of the teleoperated industrial robot is located apart from the robot when the industrial robot performs work. Located apart means that the operator and the teleoperated industrial robot are either within the line of sight of each other or are separated from each other by a barrier through which the operator can see the robot, or are at a distance from each other such that the robot is not within the operator's line of sight. If there is a see through barrier, the barrier separates the operator from work performed by the robot that is hazardous to the health or safety of the operator.

The principal applications for teleoperated industrial robots are machining, handling of hazardous materials, assembling/disassembling, operation in a contaminated environment, inspection and service, or other operations in an unmanned, harsh outdoor environment such as offshore, desert, Arctic, Antarctic, subsea and space.

SUMMARY OF THE INVENTION

A system for teleoperating an industrial robot having a maximum allowable speed of operation to perform a predetermined process having a maximum allowable speed has:

a station for an operator remotely located from a robot station at which both the robot and the predetermined process are located, the operator station comprising an input device for said operator to send signals to a computing device located at the robot station for controlling the robot to perform the predetermined process;

a communication link between the operator station and the robot station for transferring signals to and from the operator station and the robot station;

the computing device,
  a. determining if the robot is in a teleoperation mode of operation;
  b. determining if a watchdog signal has been received by the robot station from the operator station;
  c. measuring the rate of transmission of data from the operator station to the robot station to determine if the data transmission rate does not exceed a minimum rate of data transmission or if a maximum time for transmission of the data from the operator station to the robot station is exceeded; and
  d. undertaking one or more corrective measures when the data transmission rate does not exceed the minimum rate of data transmission and/or when the maximum time of data transmission from the operator station to the robot station is exceeded, the one or more corrective measures comprising:
    1. reducing the maximum allowable speed of operation of the robot and the maximum allowable speed of the process when the data transmission rate does not exceed the minimum rate of data transmission;
    2. stopping the robot motion and putting the predetermined process in a safe state; or
    3. transmitting a priority list of signals between the robot station and the operator station.

A method for controlling an industrial robot having a maximum allowable speed of operation to perform a predetermined process having a maximum allowable speed, both the robot and the predetermined process located at a robot station that is remotely located from a station having an operator of the robot, the robot station having a device for controlling the robot, the method, the method, is:

the controlling device,
  a. determining if the robot is in a teleoperation mode of operation;
  b. determining if a watchdog signal has been received by the robot station from a the robot station;
  c. measuring the rate of transmission of data from the operator station to the robot station to determine if the data transmission rate does not exceed a minimum rate of data transmission or if a maximum time for transmission of the data from the operator station to the robot station is exceeded; and
  d. undertaking one or more corrective measures when the data transmission rate does not exceed the minimum rate of data transmission and/or when the maximum time of data transmission from the operator station to the robot station is exceeded, the one or more corrective measures comprising:
    1. reducing the maximum allowable speed of operation of the robot and the maximum allowable speed of the process when the data transmission rate does not exceed the minimum rate of data transmission;
    2. stopping the robot motion and putting the predetermined process in a safe state; or
    3. transmitting a priority list of signals between the robot station and the operator station.

DETAILED DESCRIPTION

Figure 1:
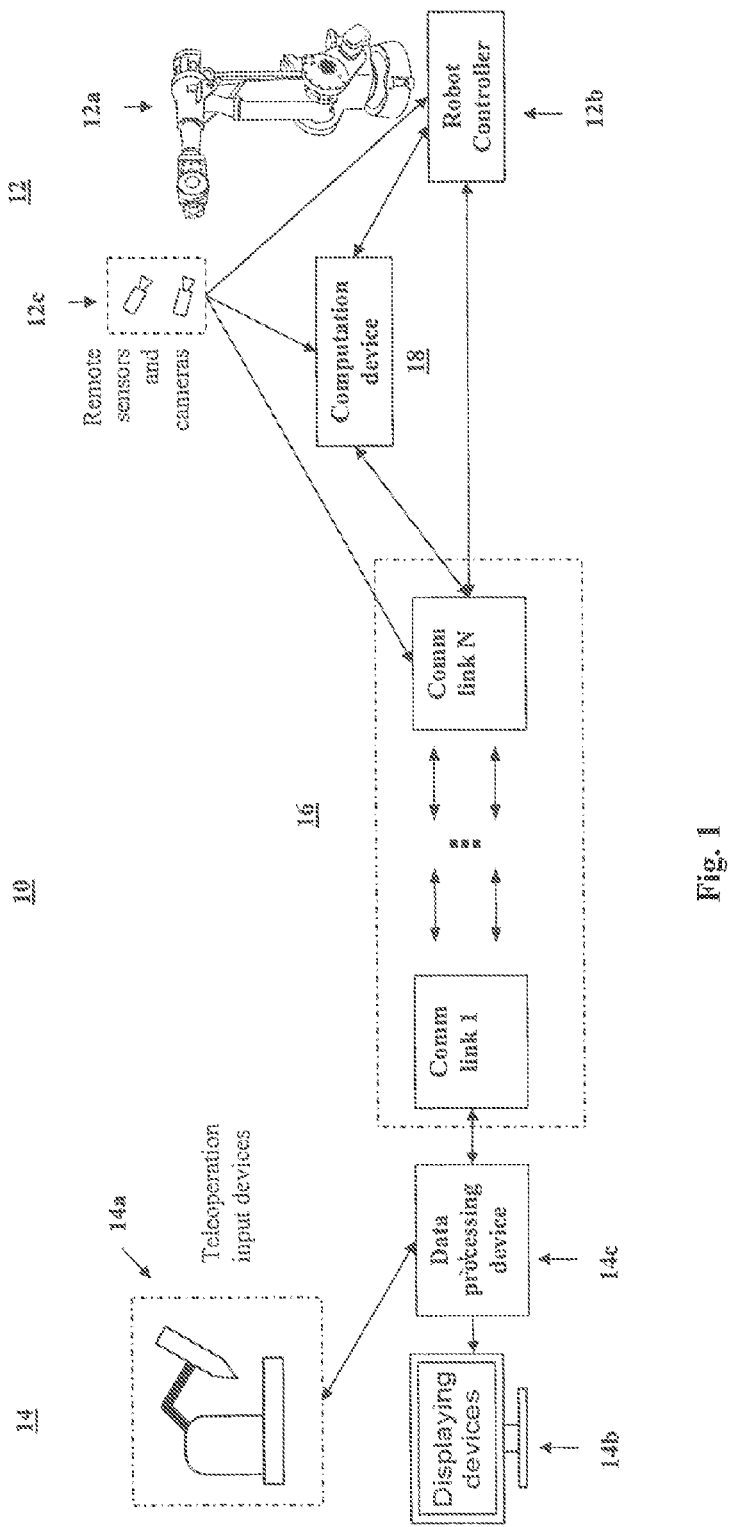
FIG. 1 shows an embodiment for a system for a teleoperated industrial robot.

Referring now to FIG. 1, there is shown a system 10 that has at least one remote robot station 12, at least one operator station 14 and at least one communication link 16 between the robot station 12 and the operator station 14. The physical distance between the remote robot station 12 and the operator station 14 can vary from "next door" to each other to "another continent".

The robot station 12 includes at least one robot 12a. Robot 12a is for example a six degree of freedom industrial robot available from ABB.

Robot station 12 also includes a robot controller 12b that includes a data interface which accepts motion commands and provides actual motion data, and optionally one or more remote sensor devices 12c that observe the robot station 12 and attached processes, such as cameras, microphones, position sensors, proximity sensors and force sensors. The sensor devices 12c may either be smart sensors, that is the sensor device 12c includes data processing capability, or not smart sensors, that is, the sensor device 12c does not include data processing capability.

If the sensor devices 12c are smart sensors then the output of the sensor devices is connected directly to robot controller 12b. If the sensor devices 12c are not smart sensors, then their output can be connected either to a computation device 18 to process the sensor device output or to the communication link 16 described in more detail below so that the sensor device output is processed in data processing device 14c.

The robot station 12 can also include as an option one or more actuators and other devices (not shown in FIG. 1 but well known to those of ordinary skill in this art), that are mounted to the robot or next to the robot, such as grippers, fixtures, welding guns, spraying guns, spotlights and conveyors.

The controller 12b has the program which when executed controls the motion of the robot 12a to perform work. As is well known, the robot may hold a tool, not shown, which is used to perform work on a stationary or moving workpiece, not shown, or may hold the workpiece which has work performed on it by an appropriate tool. The remote sensor devices 12c provide input signals to the controller 12b that the controller uses to control the robot 12a in performance of the work.

The operator station 14 has at least one teleoperation input device 14a such as joysticks or stylus-type devices which the operator uses to create continuous motion signals (position or speed signals). When force feedback is added to these devices they become haptic devices. This feedback causes a vibration in the joystick and the operator feels the force feedback in the stylus-type devices.

The signals from these input devices 14a are used by the controller 12b to operate the robot 12a. The device side also has at least one display device 14b and a data processing device 14c which is connected to both the input devices 14a and the display devices 14b.

The monitoring (display) device 14b shows actual data about the robot motion and attached processes, for example, camera images, acoustic feedback and sensor values. The data processing device 14c processes data in both directions. Device 14c may for example be an industrial PC or a PLC.

The operator station 14 may also include a safety enable device (not shown in FIG. 1) that is separate and distinct from input devices 14a and may for example be a three position switch. The safety enabling device enables and disables power to the robot 12a and attached processes.

The communication link 16 connects the robot controller 12b and the data processing device 14c to each other. The communication link 16 comprises one or more communication links 16-1 to 16-N.

The communication link 16 between the operator station 14 and the robot station 12 may be realized with various technologies (e.g. fiber-optic/radio/cable on different types and layers of data protocols). A major portion or the entire infrastructure of the communication link may already exist and be used for other purposes than teleoperating robots. Typical examples are existing Ethernet installations with LAN and WLAN, Bluetooth, ZigBee and other wireless industrial links, point-to-point radio systems or laser-optical systems, and satellite communication links.

System 10 is operated to maintain a reliable "real-time" communication link 16 between device side 14 and the remotely located robot side 12. The system 10 changes parameters of the communication link 16 and the robot motion, depending on the current available data rate and/or transmission time of the communication link 16.

In system 10, the operator has direct remote control of the motion of robot 12a and attached processes. Thus the term "real-time" as used herein is in the context of teleoperation of motion of a robot 12a or a machine. The teleoperation is considered to be real-time if:

a maximum delay between operator commands, robot motion, and feedback about robot motion and attached processes at the operator station is not exceeded, and the maximum delay is dependent on the speed of machine motion, i.e. with slow machine motion a slightly longer delay is acceptable, and the maximum delay is deterministic, i.e. the delay time does not significantly vary over time.

Exceeding the maximum delay may result in damage to the workpiece or to the robot or other equipment on the robot side. For example, if the teleoperated robotic is used in a grinding application and the communication delay exceeds the maximum delay, this will cause the operator to remove more material from the workpiece than desired. This excess removal of material can result in damage to the workpiece. Also for example, if the teleoperated robot is used in a material handling application, the communication delay exceeding the maximum delay will cause the collision between the robot 12a and other equipment on robot side.

This understanding of "real-time" is similar to real-time computation, where not only wrong results of logic and arithmetic operations can occur but also not timely results will cause errors.

Figure 2:
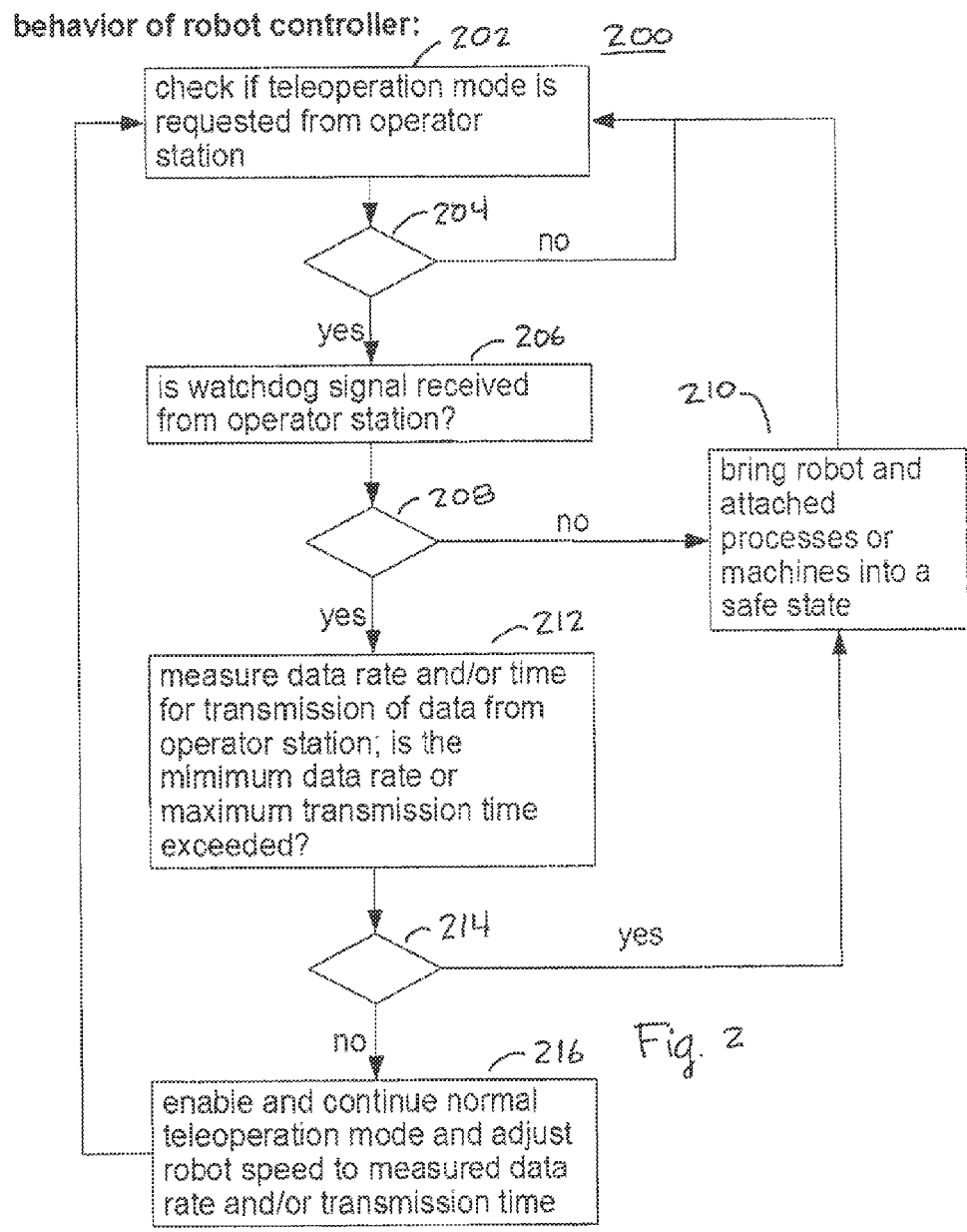
FIG. 2 is a flowchart for the functionality in the robot controller that is used to ensure that when one of several predetermined conditions occur the robot motion and attached processes are put in a safe state.

System 10 has in robot controller 12b functionality shown in the flowchart 200 of FIG. 2 that is used to control robot 12a and ensure that when one of several predetermined conditions occur the robot motion and attached processes are put in a safe state.

Referring now to FIG. 2, the robot controller 12b first determines at 202 if the operator has requested the teleoperation mode of operating robot 12a. If at query 204, the answer is that the operator has not requested that mode of operation then the flow returns to 202. If the operator has requested the teleoperation mode of operation, then the flow proceeds to 206.

There is watchdog functionality between the operator station 14 and the robot station 12. This functionality can if one of the conditions described below exist stop robot motion and put the attached processes into a safe state when the communication link is interrupted.

At 206, if the watchdog signal is received from the operator station, then since the answer at query 208 is yes, the program in the robot controller 12b proceeds to 212 where the data rate and/or the time for transmission (of a reference data packet size) of the communication link is continuously measured or estimated. The program in the controller 12b undertakes at 210 the corrective measures described below if from the combination of block 212 and query 214 the controller 12b determines that the minimum data rate is not satisfied or the maximum transmission time is exceeded. Of course as shown by block 216, the corrective measures are not undertaken if the answer to query 214 is no.

The corrective measures undertaken at 210 are:

a data rate adaption functionality that reduces the maximum allowable speed of the robot and attached processes if the speed of the communication link decreases;

a minimum required data rate and/or a maximum allowed transmission time; if these limits are not met, then the robot motion is stopped and attached processes are put into a safe state; and a priority list of signals that are transmitted between the robot station 12 and the operator station 14; if the data rate decreases and/or the transmission time increases, lower priority signals are deactivated or their signal bandwidth is reduced resulting e.g. in lower resolution video image, lower sample rate audio signal.

Additionally in system 10, the priority of signals between the robot station 12 and the operator station 14 can be changed, depending on the current status of the system. Examples of changes in the priority of the signals are:

The operator moves the robot with the input device 14a—the enable signal and motion signals have highest priority.

The robot drives are disabled and the operator observes a process at the robot station—camera or sensor signals have highest priority.

The robot and attached processes are put into a safe state—sensor and camera feedback signals have highest priority.

Further, if the data rate decreases and/or the transmission time increases, then:

allowable limits of other process parameters are adapted, such as force, compliance; and input control parameters are adapted, such as scale of motion commands at the input device.

As is described above, the operator uses the teleoperation device 14a to send signals over the data communication 16 to the robot controller 12b. The controller 12b controls the motion of the robot 12a based on the operator's input. Because there is a delay both in the communications equipment and by human operators in responding to incidents, real time safety zone generation is necessary to protect the system 10 or other objects that enter into the working area of the robot 12a from damage.

Figure 3:
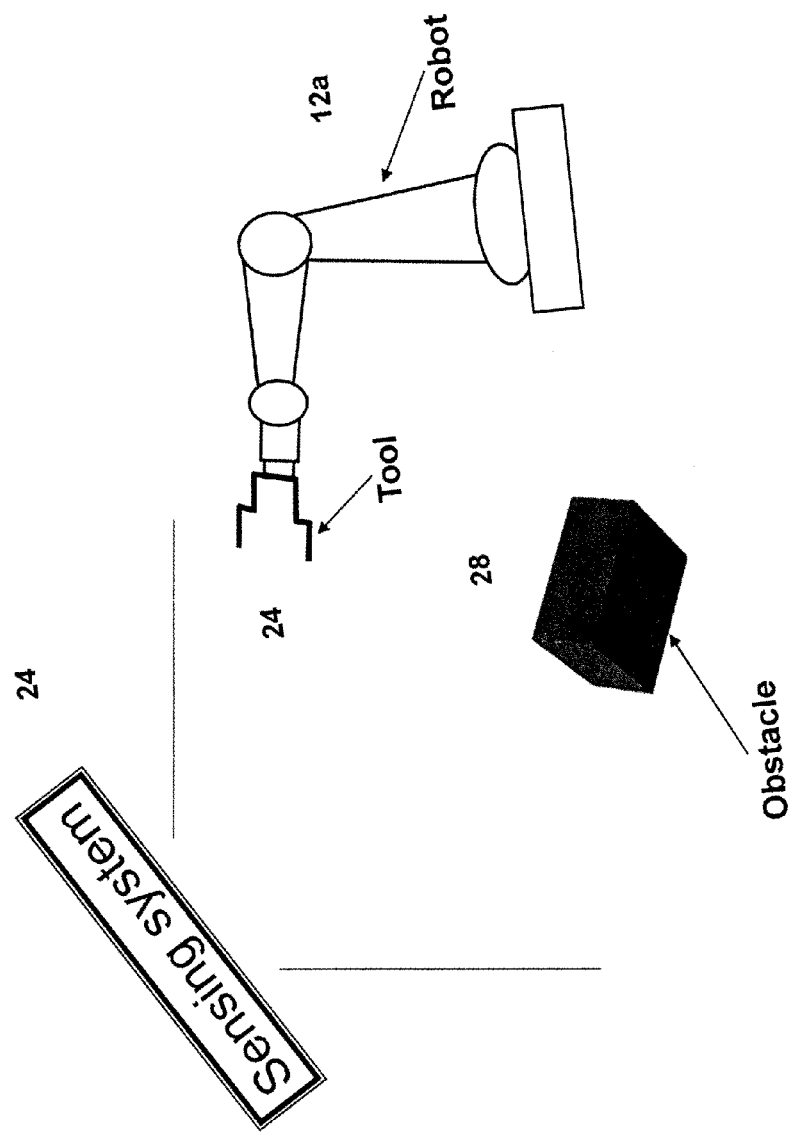
FIG. 3 shows the teleoperated industrial robot of FIG. 1 with a tool and associated smart sensing system and an example of an obstacle that enters the workspace of the robot.
Figure 4:
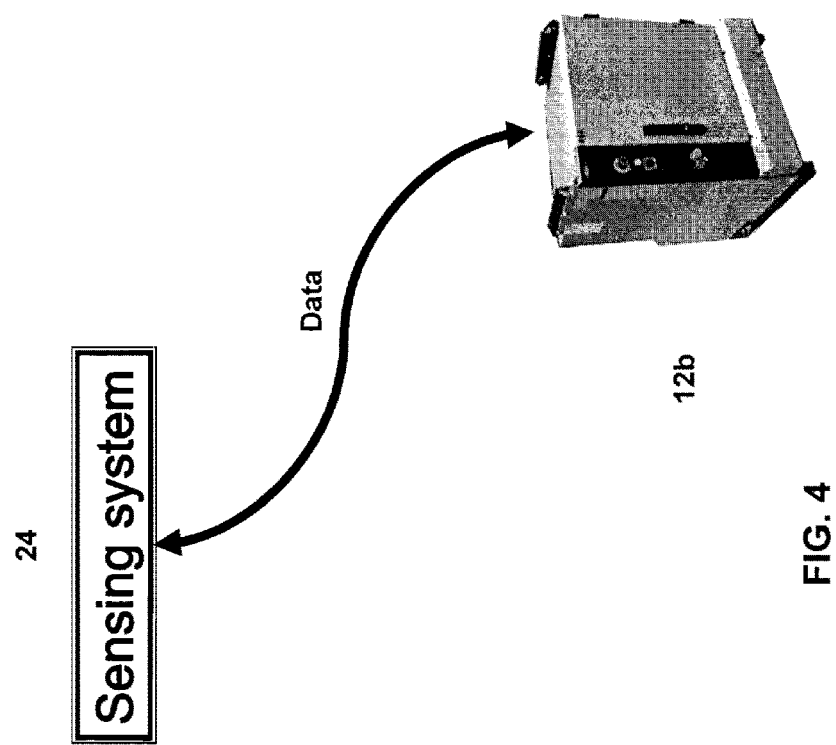
FIG. 4 shows the smart sensing system of FIG. 3 and the robot controller of FIG. 1.

The sensors 12c are mounted either on the robot 12a or at other locations and detect obstacles that enter into the workspace of the robot. One example of an obstacle 28 is shown in simplified form in FIG. 3. The sensor information is processed by the sensing system 24 if the sensor is a smart sensor as shown in FIG. 4. Since a smart sensor 24 has processed the sensor information on board, the smart sensor only transfers to the robot controller 12b data about the obstacle, such as position and geometric information.

Figure 5:
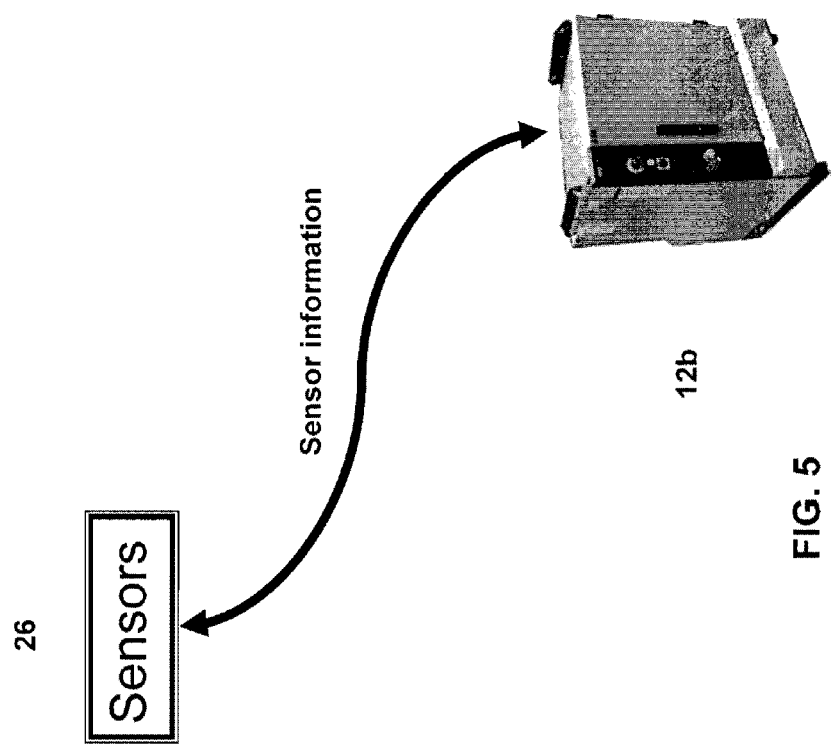
FIG. 5 shows a not smart sensor and the robot controller of FIG. 1.

When the sensor is not a smart sensor as shown by sensor 26 in FIG. 5, the sensor information is not processed in the sensor as the sensor 26 does not have a computation device.

The sensor information must then be processed either by a computation device 18 or the robot controller 12b, or be transferred to the teleoperation device side 14 via communication link 16 and then be processed by data processing device 14c. The not smart sensors can without limitation be a camera (2D & 3D), distance sensor, 3D scanner and laser scanner etc.

The information from either the sensor system 24 or the not smart sensor 26 can be used by the robot controller 12b to build a distance map and/or 3D map. The raw sensor information from the not smart sensor 26 must first be processed in a computation device such as device 18 shown in FIG. 6. The processed sensor information can then be used to build the map.

The processed sensor information is used to generate a safety zone. For example, when one moving obstacle comes into the workspace of the industrial robot, a map M is built, i.e., $$M=f(O)$$

where $O_i$ are the obstacle(s) and f is the mapping function. The map could include the location and/or geometry of the obstacles. As can be appreciated the map M is built for the first sensed moving obstacle in the workspace. The map is updated when a second sensed obstacle has moved into the workspace.

The map is used to build the safety zone S:

$$S=F(M)$$

where F is the safety zone function. The safety zone function F can be defined as a sphere, a cube or other shapes. When the obstacle geometry is included in the map function f, the safety zone generation function F should consider the geometry. For example, the boundary of the obstacle can be used to generate the safety zone. The safety zone is displayed on the teleoperation input device side 14 and the operator can see the safety zone on the display device 14b.

In addition to or in lieu of using the map M to generate safety zones, the map M can be used by controller 12b to generate an obstacle resistance R:

$$R=F(M)$$

where R is fed back to the teleoperator and F is the resistance generation function. The amount of resistance increases as the obstacle comes closer to the robot and thus from the increased resistance the operator has an indication of how close the obstacle is to the robot. In this instance the safety zone is also displayed by the haptic device to the operator.

There are different methods that can be used to generate the resistance function. Two of those methods, using an impedance resistance generation or using a fuzzy function, are described below.

Method 1: Impedance Resistance Generation

The resistance is determined based on the obstacle's distance, velocity and acceleration:

$$R=K_a a+K_v v+K_d d$$

Where $K_a$, $K_v$, $K_d$ are resistance gains respectively; a,v,d are relative acceleration, velocity and position of the obstacle respectively. Since the acceleration signal may be noisy and difficult to obtain, it can be eliminated.

Method 2: Fuzzy Function

The resistance is determined based on the location of the obstacle and using a fuzzy function $\tilde{F}$ as described below is one of the several methods that can be used to generate the resistance function, $\tilde{R}$. If the obstacle is getting closer, the resistance is increased; otherwise, if the obstacle is moving away, the resistance is decreased.

$$\tilde{R}=\tilde{F}(a,v,d)$$

The computed resistance can be used to control the motion of the robot such that the collision can be avoided. There are different methods can be used to change the motion of the robot.

One method is to use a discrete function: (1) the robot will stop moving once the resistance is more than a set value; (2) the robot will move normally if the resistance is less than the set value.

The other method is to use force control if the robot controller has integrated force control. The resistance can be considered as an external force applied onto the robot. Thus as the resistance increases the robot motion decreases and vice versa.

Figure 6:
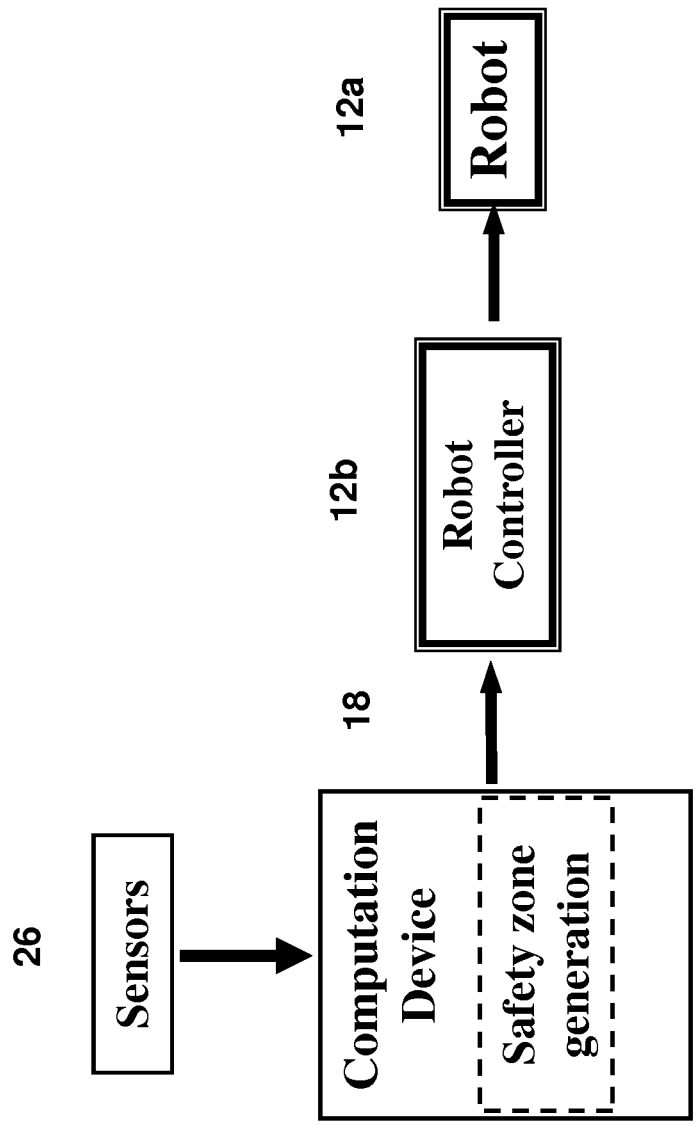
FIG. 6 shows the not smart sensor, a computation device for processing the information from the sensor to generate the safety system map, the robot controller and the industrial robot.
Figure 7:
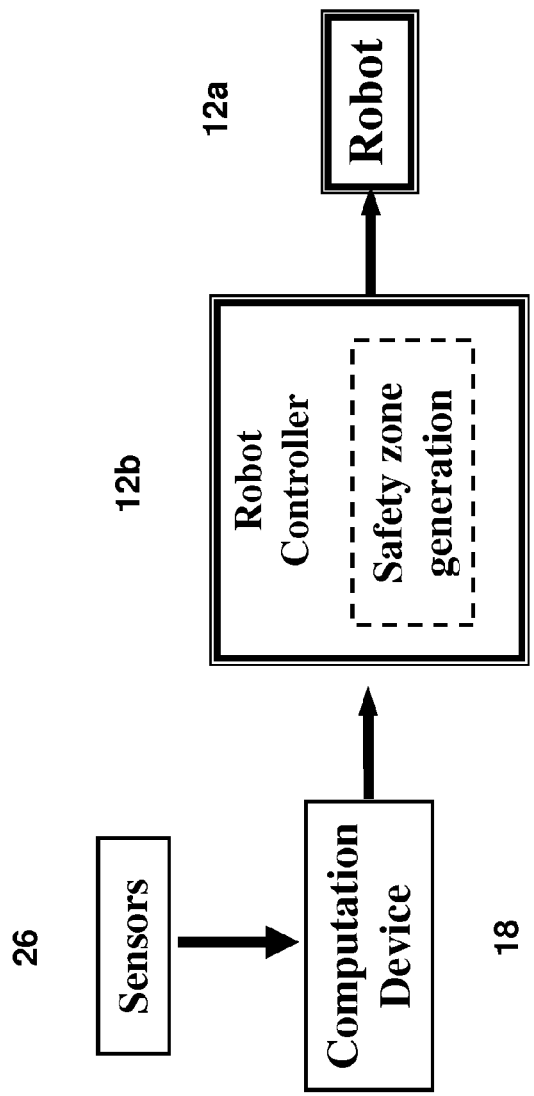
FIG. 7 shows the embodiment of FIG. 6 in which the safety system map is generated in the robot controller.
Figure 8:
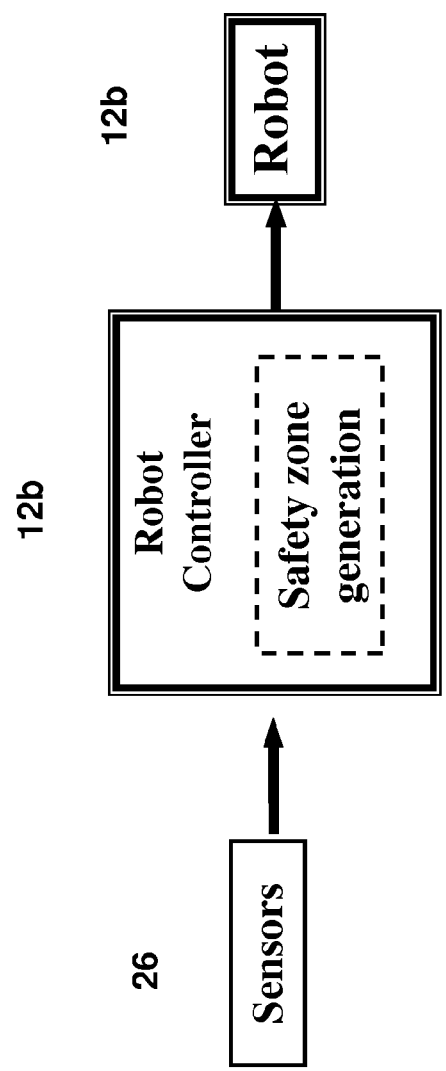
FIG. 8 shows an embodiment having a not smart sensor system and a robot controller for generating the safety system map.

FIG. 6 shows an embodiment of the safety sensing system in which a computation device 18 such as a computer processes the information from the not smart sensors 26 shown in FIG. 5 to generate the safety zone map. FIG. 7 shows an embodiment of the safety sensing system that also has both a computation device 18 and a robot controller 12b but the input from the not smart sensors 26 of FIG. 5 is processed by controller 12b to generate the safety system map. FIG. 8 shows an embodiment of the safety sensing system that has only a robot controller 12b to process the input from the smart sensors 24 shown in FIG. 4 to generate the safety system map.

Figure 9:
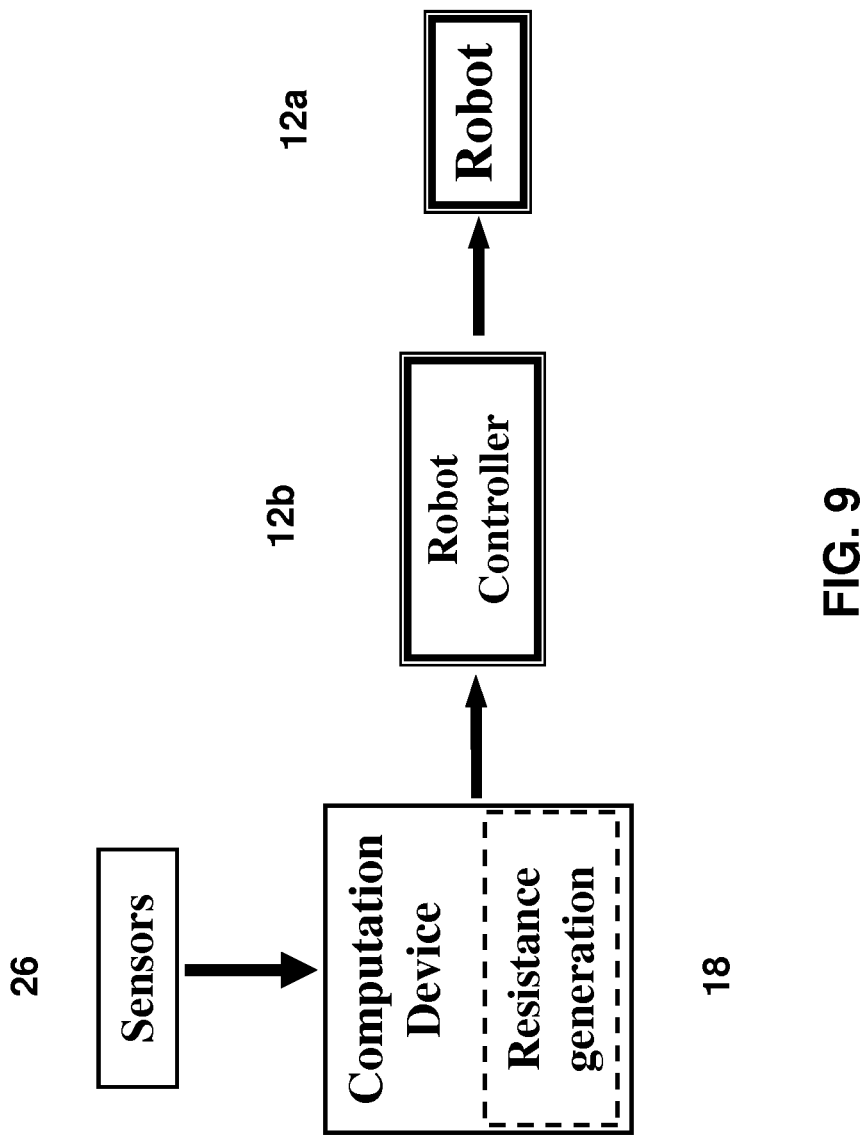
FIGS. 9, 10 and 11 show embodiments in which a resistance function is generated in a computation device (FIG. 9), generated in a robot controller instead of a computation device (FIG. 10) or in a robot controller in the absence of a computation device (FIG. 11).
Figure 10:
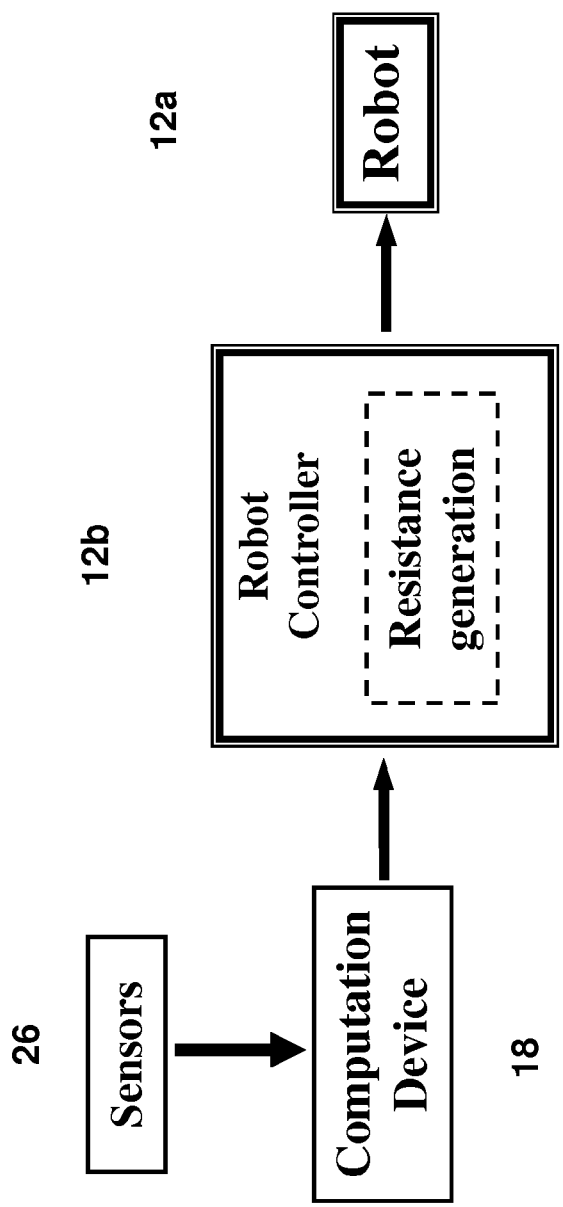
Figure 11:
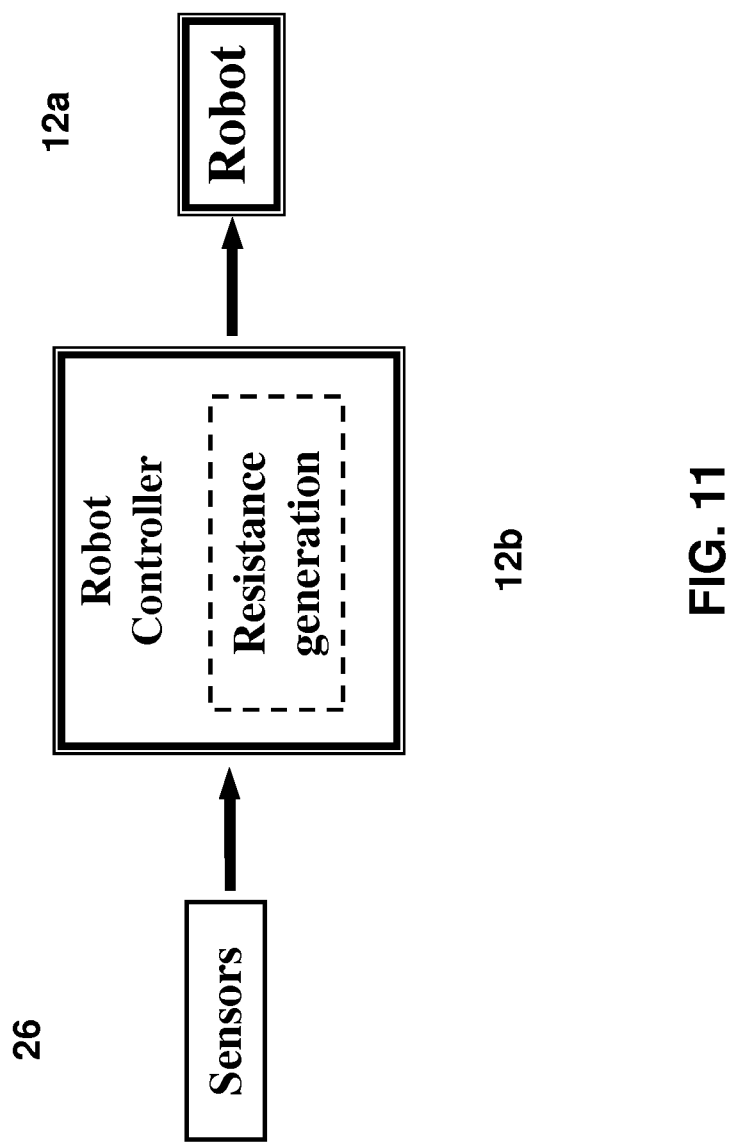

FIGS. 9, 10 and 11 are identical to FIGS. 6, 7 and 8, respectively with the difference being that the device that processes the signals from the sensors 24 or 26, namely the computation device 18 in FIG. 9 and the robot controller 12b in FIGS. 10 and 11, generates the resistance function described above.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for teleoperating an industrial robot having a maximum allowable speed of operation to perform a predetermined process having a maximum allowable speed comprising:
   a station for an operator remotely located from a robot station at which both said robot and said predetermined process are located, said operator station comprising an input device for said operator to send signals to a computing device located at said robot station for controlling said robot to perform said predetermined process;
   a communication link between said operator station and said robot station for transferring signals to and from said operator station and said robot station;
   said computing device,
   a. determining if said robot is in a teleoperation mode of operation;
   b. determining if a watchdog signal has been received by said robot station from said operator station;
   c. measuring the rate of transmission of data from said operator station to said robot station to determine if said data transmission rate does not exceed a minimum rate of data transmission or if a maximum time for transmission of said data from said operator station to said robot station is exceeded; and
   d. undertaking one or more corrective measures when said data transmission rate does not exceed said minimum rate of data transmission and/or when said maximum time of data transmission from said operator station to said robot station is exceeded, said one or more corrective measures comprising:
      1. reducing said maximum allowable speed of operation of said robot and said maximum allowable speed of said process when said data transmission rate does not exceed said minimum rate of data transmission;
      2. stopping said robot motion and putting said predetermined process in a safe state; or
      3. transmitting a priority list of signals between said robot station and said operator station.

2. A method for controlling an industrial robot having a maximum allowable speed of operation to perform a predetermined process having a maximum allowable speed, both said robot and said predetermined process located at a robot station that is remotely located from a station having an operator of said robot, said robot station having a device for controlling said robot, said method, comprising:
   said controlling device,
   a. determining if said robot is in a teleoperation mode of operation;
   b. determining if a watchdog signal has been received by said robot station from said operator station;
   c. measuring the rate of transmission of data from said operator station to said robot station to determine if said data transmission rate does not exceed a minimum rate of data transmission or if a maximum time for transmission of said data from said operator station to said robot station is exceeded; and
   d. undertaking one or more corrective measures when said data transmission rate does not exceed said minimum rate of data transmission and/or when said maximum time of data transmission from said operator station to said robot station is exceeded, said one or more corrective measures comprising:
      1. reducing said maximum allowable speed of operation of said robot and said maximum allowable speed of said process when said data transmission rate does not exceed said minimum rate of data transmission;
      2. stopping said robot motion and putting said predetermined process in a safe state; or
      3. transmitting a priority list of signals between said robot station and said operator station.

* * * * *